United States Patent
Huang et al.

(10) Patent No.: US 7,250,976 B2
(45) Date of Patent: Jul. 31, 2007

(54) LAYOUT OF THE OPTICAL PATH IN AN IMAGE CAPTURING SYSTEM

(75) Inventors: Yin-Chun Huang, Hsin-Chu (TW); Chien-Liang Yeh, Hsin-Chu (TW)

(73) Assignee: Transpacific IP, Ltd., Taipei (TW)

( * ) Notice: Subject to any disclaimer, the term of this patent is extended or adjusted under 35 U.S.C. 154(b) by 927 days.

(21) Appl. No.: 10/195,363

(22) Filed: Jul. 16, 2002

(65) Prior Publication Data
US 2003/0122953 A1   Jul. 3, 2003

(30) Foreign Application Priority Data
Dec. 31, 2001   (TW)   .............................. 90133068 A

(51) Int. Cl.
*H04N 5/225* (2006.01)
*G02B 5/08* (2006.01)
*G02B 7/182* (2006.01)
(52) U.S. Cl. ...................................... 348/374; 359/850
(58) Field of Classification Search ................ 348/223, 348/373, 374; 358/474; 359/514, 834, 850, 359/855–857, 861
See application file for complete search history.

(56) References Cited

U.S. PATENT DOCUMENTS

| | | | |
|---|---|---|---|
| 5,923,474 A * | 7/1999 | Mou | 359/618 |
| 6,101,334 A * | 8/2000 | Fantone | 396/72 |
| 6,227,449 B1 * | 5/2001 | Huang | 235/454 |
| 6,456,412 B1 * | 9/2002 | Shyu | 359/196 |
| 6,631,844 B1 * | 10/2003 | Ohkawa et al. | 235/462.38 |
| 2002/0191662 A1 * | 12/2002 | Perry et al. | 372/66 |

* cited by examiner

*Primary Examiner*—Lin Ye
*Assistant Examiner*—James M. Hannett
(74) *Attorney, Agent, or Firm*—Marger Johnson & McCollom, PC

(57) ABSTRACT

The image-capturing system comprises a image-capturing module and a plurality of mirrors, wherein the image-capturing module has a lens and a charge-coupled device (CCD). The image-capturing module is located on about the center in the image-capturing system, and a plurality of mirrors are arranged in the peripheral region within the image-capturing system to make the layout of optical path around the image-capturing module. Furthermore, reflectional angle of each mirror can be adjusted according to the requirement for design, so as to obtain the longest optical path.

13 Claims, 3 Drawing Sheets

LAYOUT OF THE OPTICAL PATH IN AN IMAGE CAPTURING SYSTEM

BACKGROUND OF THE INVENTION

1. Field of the Invention

The present invention relates generally to layout of the optical path in the image-capturing system, and more particularly to an optimum layout of the optical path in the image-capturing system and the method for forming the same.

2. Description of the Prior Art

Recently, there are various digital products that have been developed within the industry, such as notebooks, Personal Digital Assistants (PDA), and Consumption-Communication-Computers (3C). Usually, these digital products include or connect with a monitor to display an image, such as liquid crystal display (LCD) or liquid crystal panel. For the image processing apparatus, in addition, they can be classed as a motionless-image processing apparatus, such as digital camera, scanner, and a moving-image processing apparatus, such as digital video camera.

In the image-processing apparatus, the image-capturing system is the most important member, wherein the image-capturing system is one of the products concerning optical principle that comprises various components, such as image-capturing system, reflector, lens. Generally, the image-capturing system includes a charge-coupled device (CCD) that is sensitive to light, and it can transform photosensitivity of each pixel device into image datum and store them.

In light of the scanner, conventional image-capturing system captures the image by moving the signal image-capturing apparatus and reflection of mirrors. When the light is reflected from the image on the sensitive surface of the charge-coupled device (CCD), a semiangle (θ/2) can be generated. Generally, the sensitive surface of the charge-coupled device (CCD) is a straight surface, and it is not an arc surface. Therefore, the sensitive surface of the charge-coupled device(CCD )cannot receive the reflecting light when the semiangle (θ/2) becomes over large. In view of this, the semiangle (θ/2) has to be decreased so as to completely receive the reflecting light by the charge-coupled device (CCD), wherein one of the method for decreasing the semiangle (θ/2) is to increase the optical paths. Furthermore, the longer the length of the optical paths, the smaller the semiangle (θ/2). In the same way, the longer the length of the optical paths, the smaller the sensitive surface of the charge-coupled device (CCD), so that the whole volume also can be decreased. Therefore, the image-capturing system with the longer optical path reduces the cost for fabricating the image-capturing module and easy to make it.

Moreover, the image-capturing module, the reflectors and the lens are arranged in the peripheral region of conventional image-capturing system. Referring to FIG. 1, the image-capturing system 100 comprises a case 110 with a layout region 110A for optical path, and a module region 110B therein, wherein the mirrors 120A to 120C are set in the layout region 110A; and further, the lens 130 and the image-capturing module 140 are set in the module region 110B. In general, the layout region 110A for optical path is located on the peripheral region of the case 110, which is only the space for being applied to the layout of optical path, and the methods for layout of optical path are difference among the various sizes of the circular diameter (Ø) of the lens. Therefore, if the sizes of the image-capturing module 140 and the lens 130 are greater, they will occupy the major portion of space in the case 110 of the image-capturing system 100 that results in the limitation of length in layout for optical path.

In accordance with the above description, a new optimum layout of the optical path in the image-capturing system and the method for forming the same is therefore necessary to reduce the requirement for space of the image-capturing system, so as to decrease the fabricative cost and easy to make it; and further, this invention can strengthen and raise the scanning quality.

SUMMARY OF THE INVENTION

In accordance with the present invention, a new optimum layout of the optical path in the image-capturing system and the method for forming the same is provided that substantially overcomes the drawbacks of the above mentioned problems in the conventional system. This invention can improve efficiency of conventional image-capturing system by increasing the length of the optical path.

Accordingly, it is an object of the present invention to provide a new optimum layout of the optical path in the image-capturing system and the method for forming the same. The present invention arranges the image-capturing module at the center of the image-capturing system, and layout of the optical path is distributed in the space of the image-capturing system abound the image-capturing module, whereby this invention design optimum space for obtaining the longest optical path.

Another object of the present invention is to provide an optimum layout of the optical path in the image-capturing system and the method for forming the same. This invention can obtain the longer optical path by setting a plurality of mirrors. Furthermore, this invention can also adjust angles of the mirrors to achieve the requirement of the longest optical path, whereby the layout for optical path is free to design, so as to decrease the fabricative cost and easy to make it. Therefore, this invention corresponds to economic effect and utilization in industry.

In accordance with the present invention, a new optimum layout of the optical path in the image-capturing system and the method for forming the same is provided. In this invention, the image-capturing system, such as chassis, comprises a image-capturing module and a plurality of mirrors, wherein the image-capturing module has a lens and a charge-coupled device (CCD). The image-capturing module is located on about the center in the image-capturing system, and a plurality of mirrors are arranged in the peripheral region within the image-capturing system to make the layout of optical path around the image-capturing module. Furthermore, reflectional angle of each mirror can be adjusted according to the requirement for design, so as to obtain the longest optical path.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
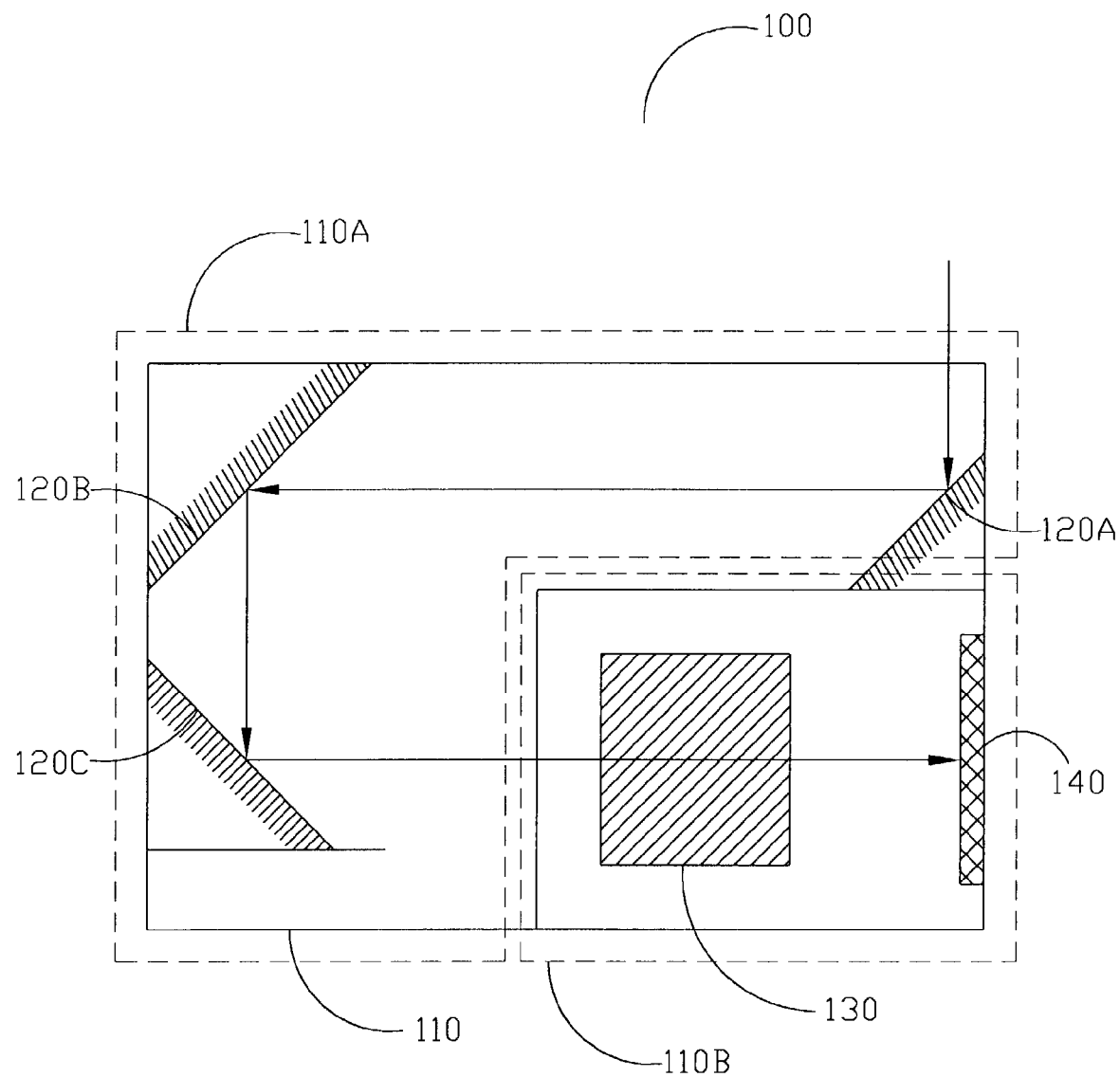
FIG. 1 shows the layout for optical path of the conventional image-capturing system.
Figure 2:
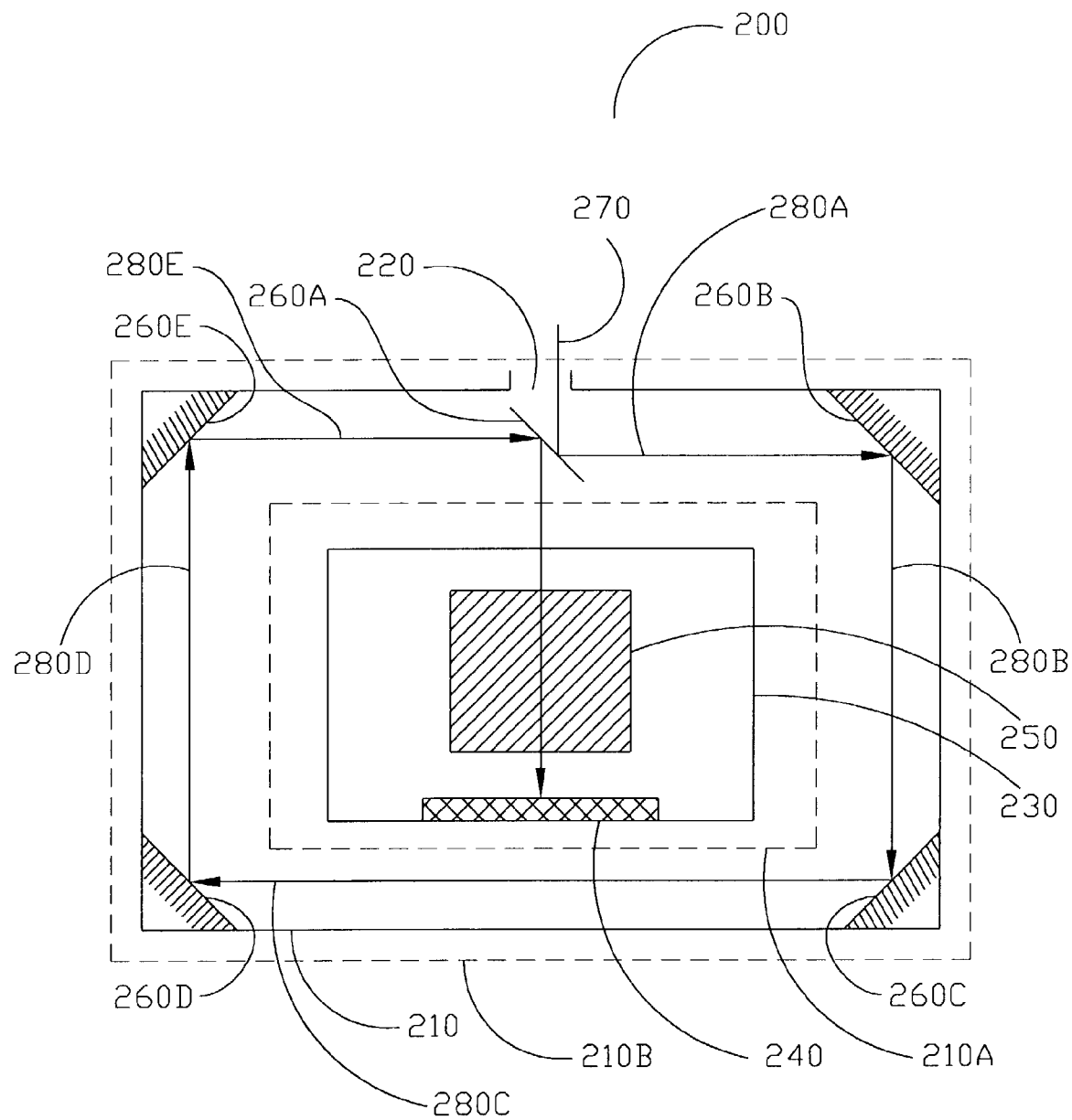
FIG. 2 shows the optimum layout for optical path of the image-capturing system in accordance with the first embodiment of the present invention.

As illustrated in FIG. 2, in the first embodiment of the present invention, first of all, an image-capturing system 200 is provided. The image-capturing system 200 comprises: a case 210 with a light inlet 220 thereon, wherein the space within the case 210 is separated a center region 210A and a peripheral region 210B around the center region 210A; an image-capturing module 230 that is about located on the center region 210A within the case 210, wherein the image-capturing module 230 comprises a photosensor 240, such as charge-coupled device (CCD) or Complementary Metal-Oxide Semiconductor Sensor (CMOS Sensor), and a lens 250, and further, the lens 250 is set before the photosensor 240 to receive the reflective light via the light entrance of the image-capturing module 230; a plurality of mirrors 260A to 260E distributed in the peripheral region 210B within the case 210, such as the corners of the peripheral region 210B, so as to make the layout of optical path in circumference of the peripheral region 210B outside the center region 210A where the image-capturing module 230 is located, wherein the mirror 260A is the double-faced mirror, wherein one side of the mirror 260A fronts the light inlet 220 to reflect an incident light 270 into peripheral region 210B of the case 210, and the other side of the mirror 260A fronts the image-capturing module 230 to reflect the light to the lens 250.

Referring to FIG. 2, in this embodiment, when the incident light 270 enters the image-capturing system 200 via the light inlet 220 on the sidewall of the case 210, the incident light 270 is reflected onto the mirror 260B by way of one side of the mirror 260A to form a first optical path 280A. Then the light is reflected onto the mirror 260C from the mirror 260B to form a second optical path 280B. Afterward, the mirror 260C reflects the light onto the mirror 260D to form a third optical path 280C, and then the light is reflected onto the mirror 260E from the mirror 260D to form a fourth optical path 280D. Subsequently, the mirror 260E reflects the light onto the other side of the mirror 260A to form a fifth optical path 280E. Finally, the light is reflected into the image-capturing module 230 by way of the other side of the mirror 260A, so that the photosensor 240 receives the light via the lens 250.

Figure 3:
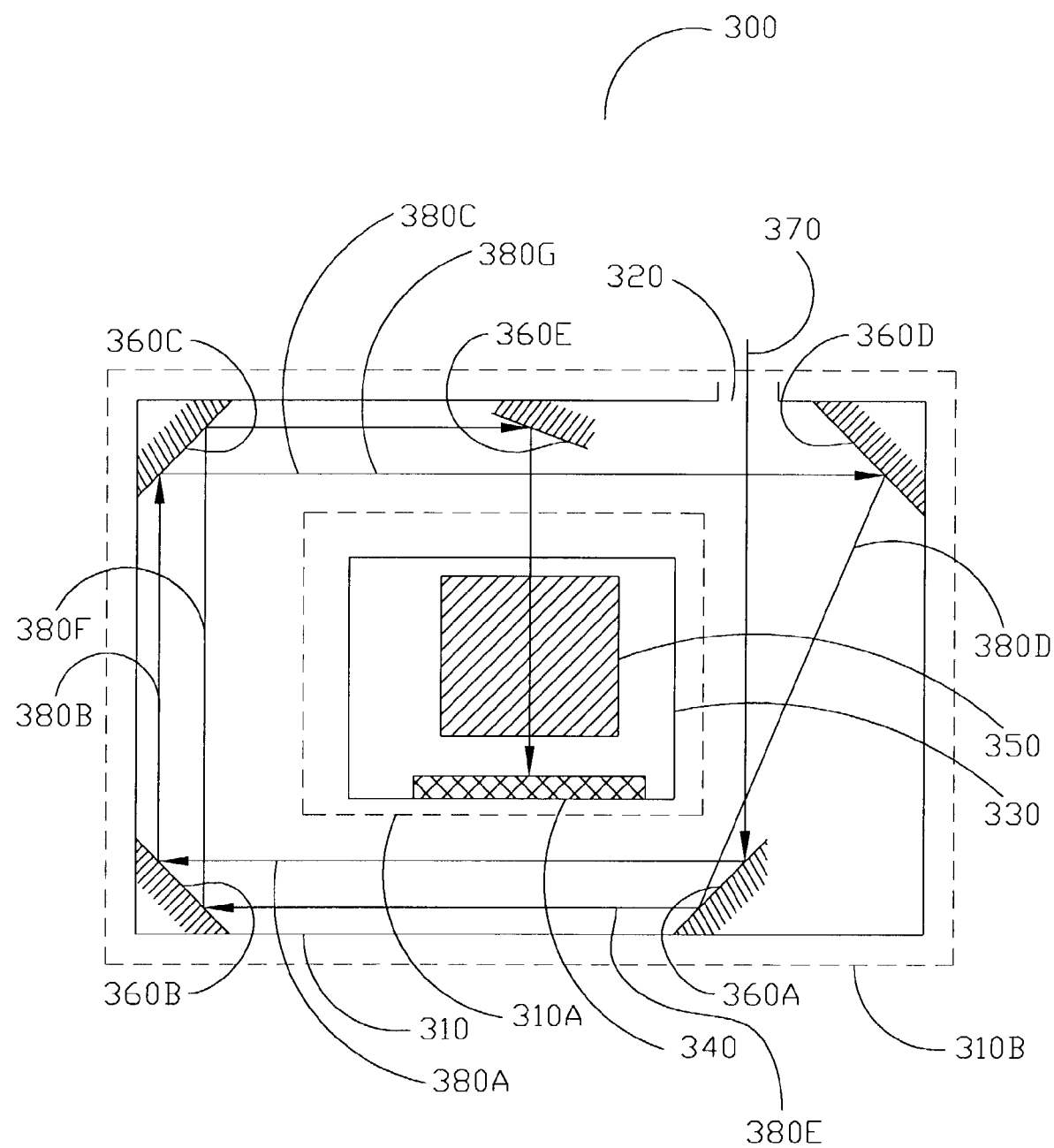
FIG. 3 shows the optimum layout for optical path of the image-capturing system in accordance with the second embodiment of the present invention.

As illustrated in FIG. 3, in the second embodiment of the present invention, first of all, an image-capturing system 300, such as chassis of the scanner, is provided. The image-capturing system 300 comprises: a case 310 with a light inlet 320 thereon, wherein the space within the case 310 is separated a center region 310A and a peripheral region 310B around the center region 310A; a image-capturing module 330 that is about located on the center region 310A within the case 310, wherein the image-capturing module 330 comprises a charge-coupled device (CCD) 340 and a lens 350, and further, the lens 350 is set before the charge-coupled device (CCD) 340 to receive the reflective light via the light entrance of the image-capturing module 330; a plurality of mirrors 360A to 360E distributed in the peripheral region 310B within the case 310, wherein the plurality of mirrors 360A to 360E are the single-faced mirrors, and individually, each is distributed with a predetermined angle at the predetermined position within the peripheral region 310B of the image-capturing system 300 to proceed with a plurality of reflections on the same mirror, and further, the position the mirror 360E is set that the light can be reflected into the image-capturing module 330.

Referring to FIG. 3, in this embodiment, when the incident light 370 enters the image-capturing system 300 via the light inlet 320 on the sidewall of the case 310, the incident light 370 is reflected in order among the mirror 360A to mirror 360D with various angles to proceed with the plurality of reflections, so as to form a plurality of optical paths 380A to 380F from the plurality of mirrors 360A to 360D each other. Finally, the light is reflected onto the mirror 360E from the mirror 360C by way of the optical path 380G, and then the mirror 360E reflects the light into the image-capturing module 330 to transmit the image signal, wherein the charge-coupled device (CCD) 340 can receive the light via the lens 350.

In these embodiments of the present invention, the present invention arranges the image-capturing module at the center of the image-capturing system, and layout of the optical path is distributed in the space of the image-capturing system abound the image-capturing module, whereby this invention design optimum space for obtaining the longest optical path. Moreover, this invention can obtain the longer optical path by setting a plurality of mirrors. Furthermore, this invention can also adjust angles of the mirrors to achieve the requirement of the longest optical path, whereby the layout for optical path is free to design, so as to decrease the fabricative cost and easy to make it. Therefore, this invention corresponds to economic effect and utilization in industry.

Of course, it is possible to apply the present invention for the image-capturing system, and to any scanner. Also, the present invention set the image-capturing module on the center region of the image-capturing system and design the optical path around the image-capturing module concerning layout for the optical path has not been developed at present.

Although specific embodiments have been illustrated and described, it will be obvious to those skilled in the art that various modifications may be made without departing from what is intended to be limited solely by the appended claims.

Obviously, many modifications and variations of the present invention are possible in light of the above teachings. It is therefore to be understood that within the scope of the appended claims, the present invention may be practiced otherwise than as specifically described herein.

What is claimed is:

1. A scanner comprising:
  a case;
  two or more mirrors located within the case, said two or more mirrors capable of reflecting light along an optical path; and
  an image-capturing module comprising a photosensor and a lens, wherein the image-capturing module is capable of receiving the reflected light, and wherein said optical path completely encircles the image-capturing module.

2. The scanner according to claim 1, wherein two sides of at least one of said two or more mirrors are capable of reflecting light at least twice along the optical path.

3. The scanner according to claim 1, wherein a sidewall of the case comprises a light inlet.

4. The scanner according to claim 1, wherein the two or more mirrors are distributed with a predetermined angle.

5. The scanner according to claim 1, wherein at least one of the two or more mirrors comprises a double-faced mirror.

6. The scanner according to claim 1, wherein at least one of the two or more mirrors comprises a double-faced mirror capable of reflecting light at least twice along the optical path.

7. The scanner according to claim 1, wherein a sidewall of the case comprises a light inlet, wherein at least one of the two or more mirrors comprises a double-faced mirror, and wherein one side of the double-faced mirror fronts the light inlet to reflect an incident light into the case.

8. The scanner according to claim 1, wherein at least one of the two or more mirrors comprises a double-faced mirror, and wherein a second side of the double-faced mirror fronts the image-capturing module to reflect light to said lens.

9. The scanner according to claim 1, wherein a sidewall of the case comprises a light inlet, wherein at least one of the two or more mirrors comprises a double-faced mirror, wherein one side of the double-faced mirror fronts the light inlet to reflect an incident light into the case, and wherein a second side of the double-faced mirror fronts the image-capturing module to reflect light to said lens.

10. The scanner according to claim 1, wherein the optical path completely encircles the photosensor.

11. The scanner according to claim 1, wherein said photosensor comprises a charge-coupled device.

12. The scanner according to claim 1, wherein said lens fronts at least one of the two or more mirrors to receive tight entering said image-capturing module; and said photosensor is positioned behind said lens.

13. The scanner according to claim 1, said lens is positioned before the photosensor to receive light entering said image-capturing module.

* * * * *

UNITED STATES PATENT AND TRADEMARK OFFICE
CERTIFICATE OF CORRECTION

PATENT NO. : 7,250,976 B2  Page 1 of 1
APPLICATION NO. : 10/195363
DATED : July 31, 2007
INVENTOR(S) : Huang et al.

It is certified that error appears in the above-identified patent and that said Letters Patent is hereby corrected as shown below:

At column 6, line 11, please replace "to receive tight" with --to receive light--.
At column 6, line 14, please replace "said lens is" with --wherein said lens is--.

Signed and Sealed this

Eleventh Day of May, 2010

David J. Kappos
*Director of the United States Patent and Trademark Office*